Figure 8:
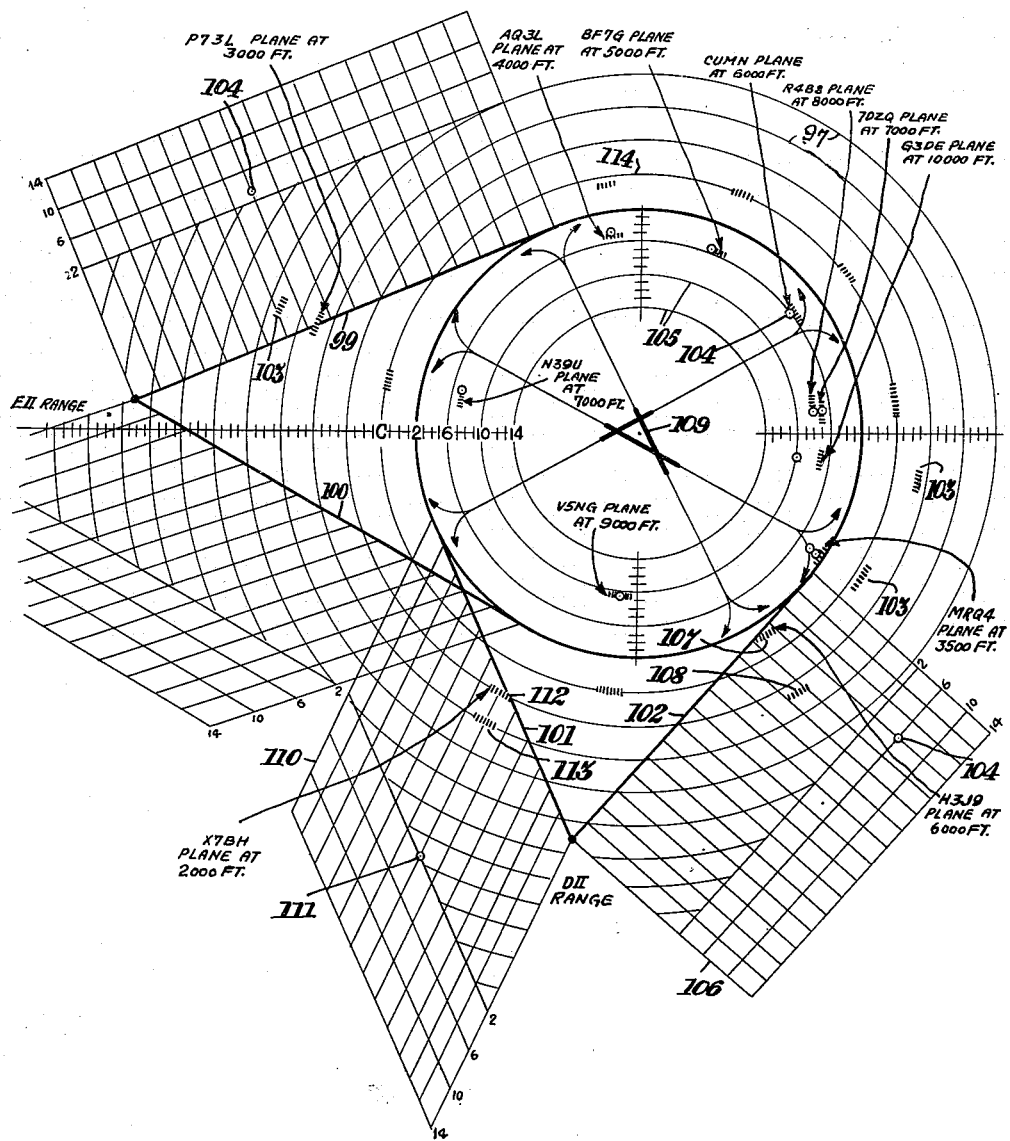

April 26, 1949.  E. M. DELORAINE  2,468,045
POSITION INDICATION SYSTEM
Filed April 28, 1944  9 Sheets-Sheet 1
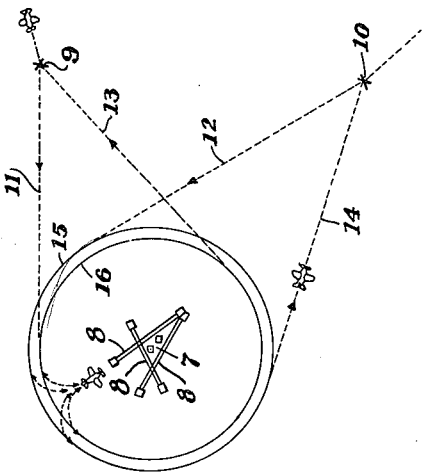
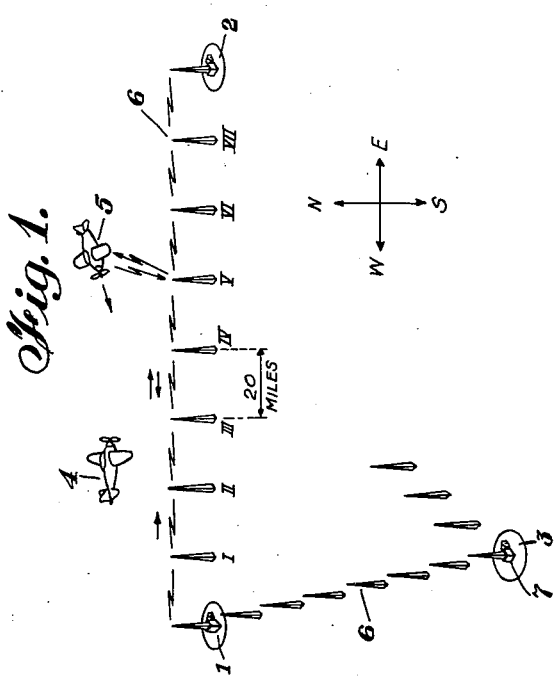
INVENTOR.
EDMOND M. DELORAINE
BY
ATTORNEY

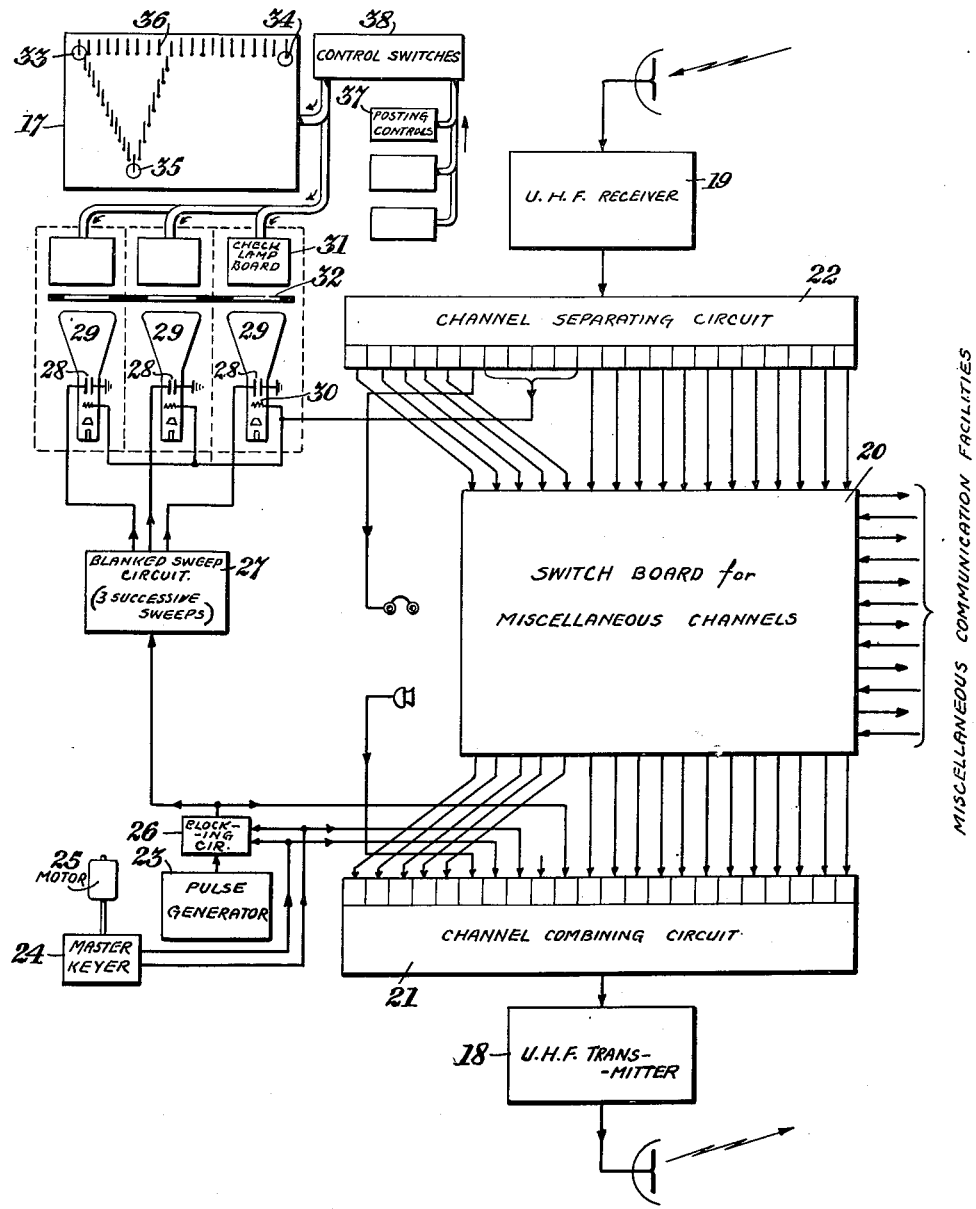

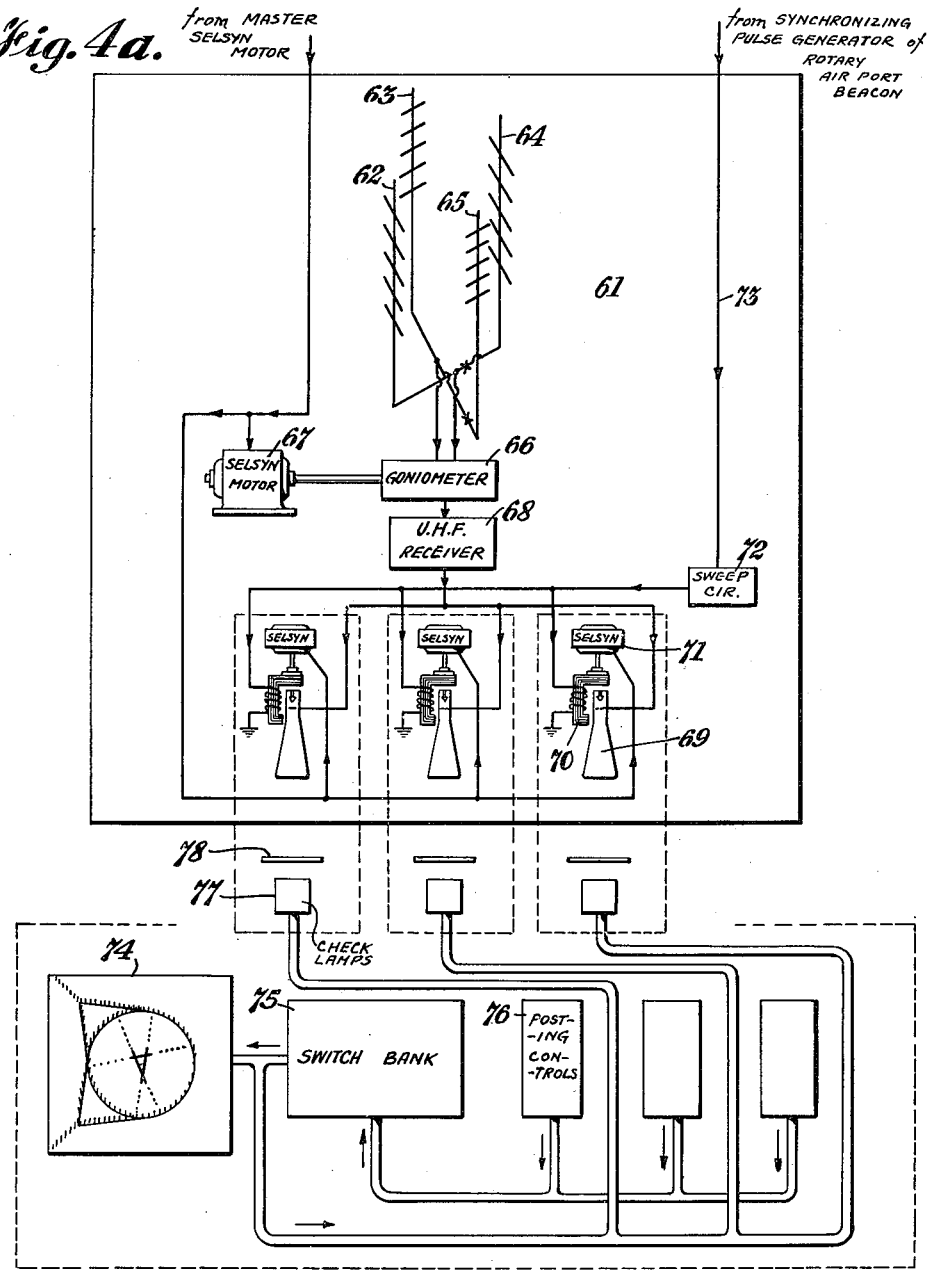

April 26, 1949.  E. M. DELORAINE  2,468,045
POSITION INDICATION SYSTEM
Filed April 28, 1944  9 Sheets-Sheet 4
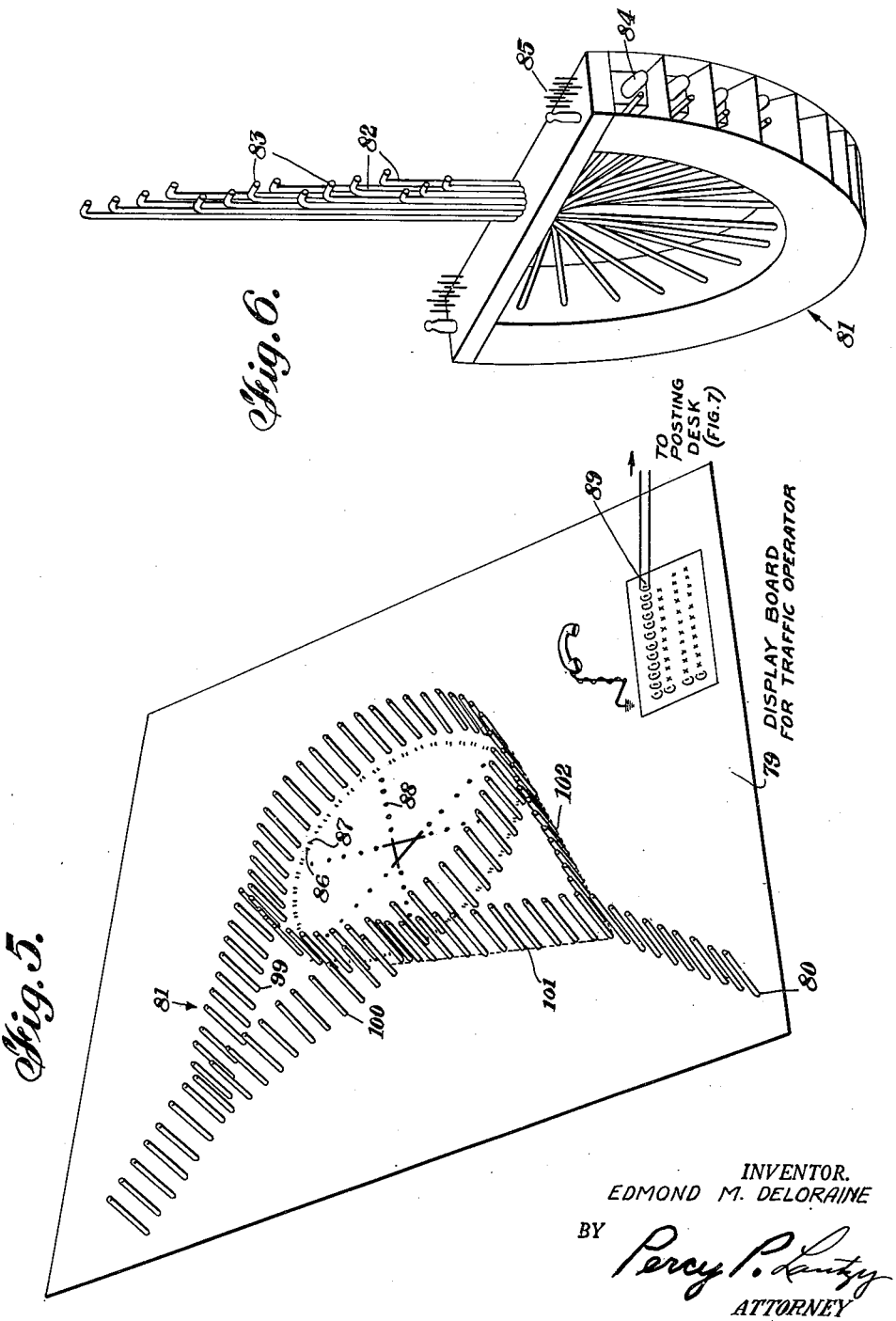
INVENTOR.
EDMOND M. DELORAINE
BY Percy P. Lantz
ATTORNEY

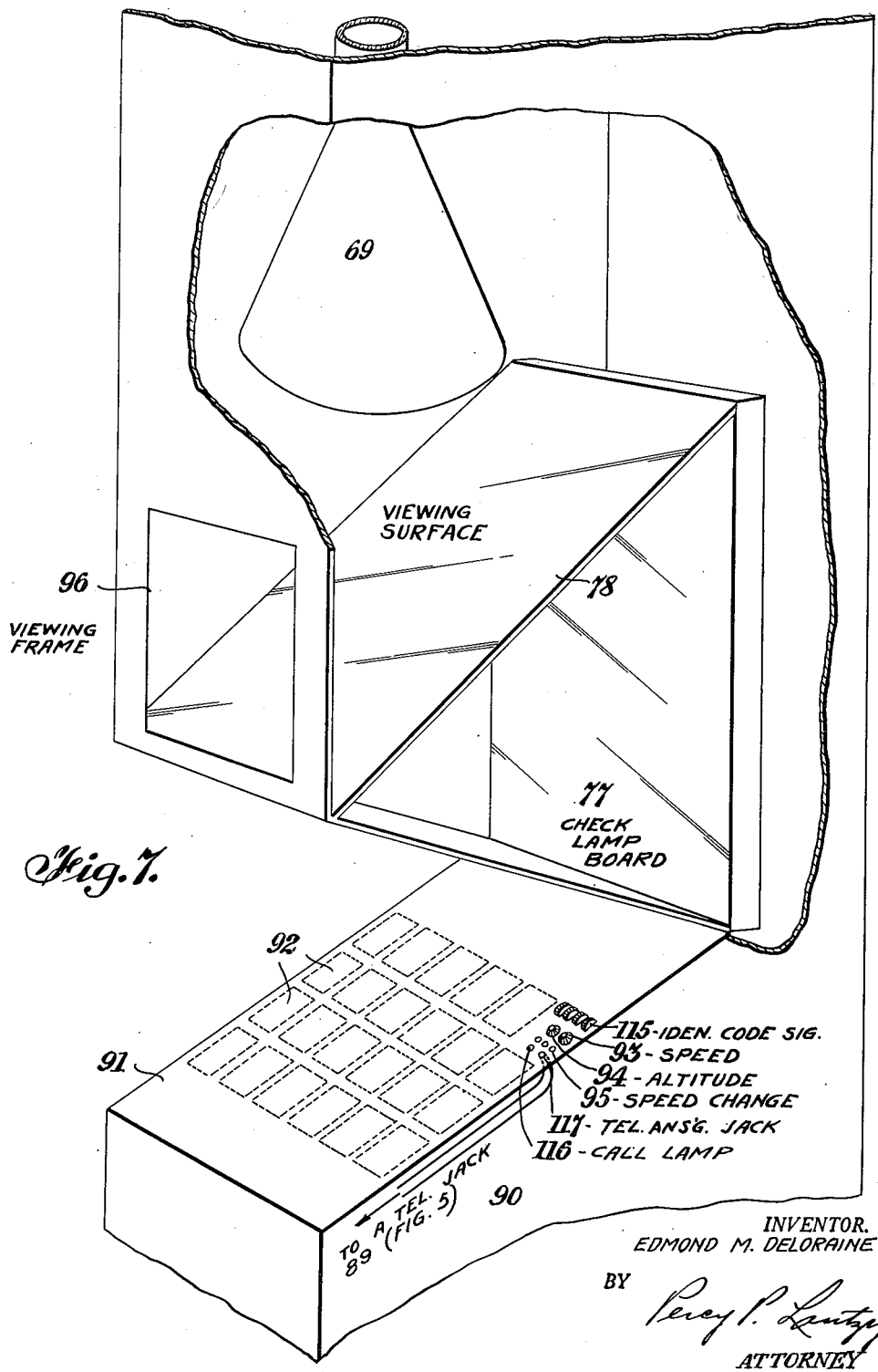

April 26, 1949.  E. M. DELORAINE  2,468,045
POSITION INDICATION SYSTEM
Filed April 28, 1944  9 Sheets-Sheet 6

INVENTOR.
EDMOND M. DELORAINE
BY
ATTORNEY

April 26, 1949.  E. M. DELORAINE  2,468,045
POSITION INDICATION SYSTEM
Filed April 28, 1944  9 Sheets-Sheet 9
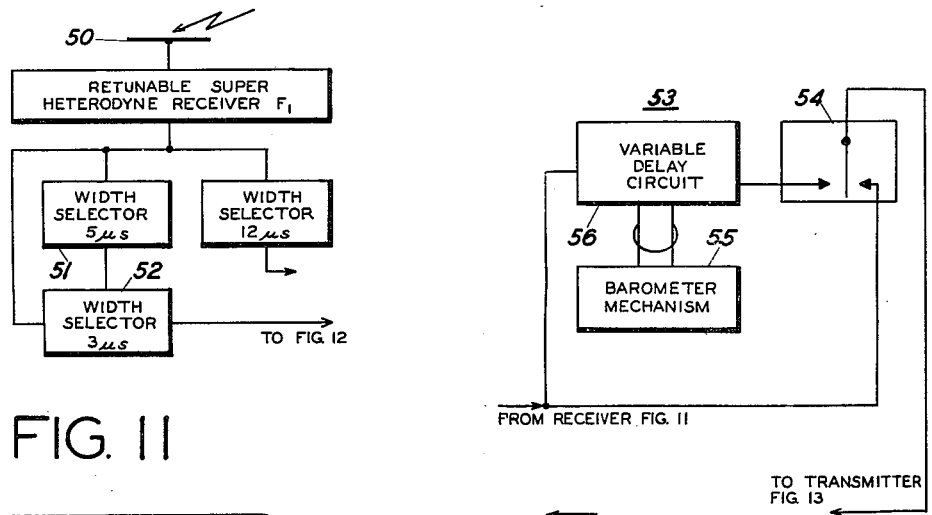
FIG. 11
FIG. 12
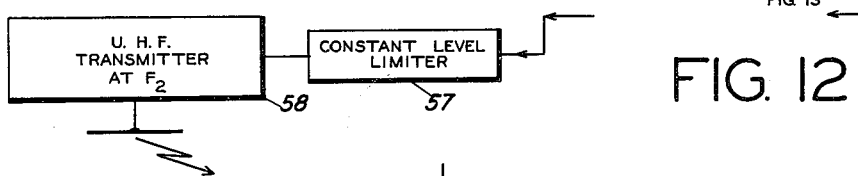
FIG. 13
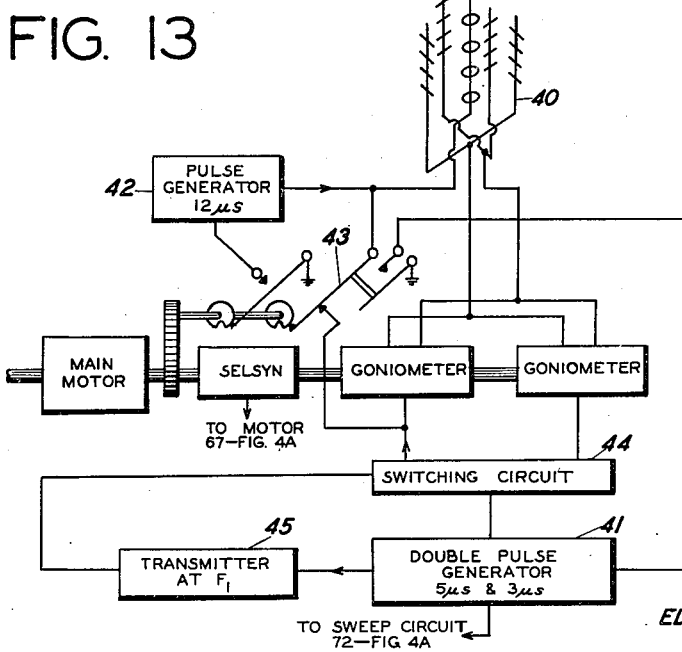
FIG. 4
Inventor
EDMOND M. DELORAINE
By Edward D. Chinney
ATTORNEY Patented Apr. 26, 1949

2,468,045

UNITED STATES PATENT OFFICE 2,468,045

POSITION INDICATION SYSTEM

Edmond M. Deloraine, New York, N. Y., assignor to Federal Telephone and Radio Corporation, New York, N. Y., a corporation of Delaware Application April 28, 1944, Serial No. 533,238

26 Claims. (Cl. 177—353)

The present invention relates to aircraft traffic control systems and more particularly to a system for indicating the location of aircraft on route to and from an airport and its location upon its approach to and during its landing at the airport.

In modern extended operation of aircraft, the general problem of air navigation may be divided into these aspects:

1. The control of traffic in the immediate vicinity of an airport, including the approach, the landing and the taking-off on and from the airport.

2. The control of aircraft in flight between airports, i. e. along air routes or airways as maintained by aeronautical authorities.

While each of the above aspects presents peculiar operational requirements of its own, it is found that, as far as the airport control center is concerned, these requirements for the proper control of aircraft traffic, in connection with planes within the center's control zone basically may be said to call for:

(a) A knowledge of the identity of the planes;
(b) A knowledge of the position of the planes;
(c) A knowledge of the altitude of the planes;
(d) A knowledge of the deviation of the planes from a prescribed traffic lane;
(e) An operating procedure remaining the same in all weather conditions;
(f) The provision of information on the ground sufficient to supervise all planes' movements, to check that they are correct or to issue supplementary instructions.

Systems have been proposed in the past which have presented individual and successive solutions to the above problems, resulting in the development of equipments that were largely unrelated and independent.

In the co-pending applications of E. M. Deloraine and P. R. Adams, Serial No. 533,322, filed April 29, 1944, and E. M. Deloraine, H. G. Busignies and P. R. Adams, Serial No. 532,798, filed April 26, 1944, there has been disclosed a universal aerial navigation and traffic-control system which has been planned as a whole from the start, which combines a number of functions with a corresponding saving in equipment, and which gives an improved knowledge of the principal elements required. This universal aerial traffic-control system is based on radio communication and comprises intercommunicating and cooperating radar type equipment at the control center, the airport, along the airways and on the planes. Employing a minimum number of transmission frequencies and with a maximum number of communicating channels, the system, as a whole is designed to perform the following six functions, the part played by telephone or telegraph being held to a minimum:

(1) the anti-collision function which provides each plane with an indication of the approximate distance and direction of any nearby planes flying at the same altitude or within one layer above or below, as well as the possibility of determining the same information for two layers above or below; (2) the self location function which provides each plane flying near an airport with an indication of its exact position with respect to a map of the airport and environs as well as an indication of its heading with respect to such map; (3) the landing beam and range function which enables each plane to fly along a predetermined landing beam defining both vertical and horizontal position or to fly along a radio range defining horizontal position only; (4) the radio compass function which continuously shows the relation of airplane heading with respect to the very same localizer or range which has been selected by the pilot for controlling the left and right airplane location indications of the landing beam and range display unit. (5) the quasi-radar function giving to the traffic control personnel on the ground a complete co-ordinated set of indications with respect to the azimuth, distance, altitude and identity of every plane which carries radar reply equipment; (6) the traffic control display function which enables the information obtained from the quasi-radar service or from other means to be all displayed together in convenient three dimensional fashion.

While the present invention is correlated to the above system as a whole, it has a more particular reference to the last two functions mentioned hereinabove.

Accordingly, it is an object of this invention to enable traffic control operators to control the flights along the last 50 miles of the airways nearest to the airport and along the traffic circles in such a way as to feed the planes on to the landing paths and runways in rapid succession at a rate comparable to the rate at which planes would land in conditions of high visibility.

It is also an object of this invention to provide at the airport control center apparatus for giving to the control personnel a complete set of indications with respect to the various location factors of every plane able to cooperate with the system during flight to and from the airport and while arriving and departing.

It is a further object to provide apparatus for the translation of the above indications into convenient three-dimensional form, if desired, remote from the indicating apparatus.

A further object is to provide a system which may be used irrespective of weather conditions, and which is more accurate and more complete in the information available than operation based on the direct observation of planes.

A further object is to provide a method for identifying and locating airplanes en route to and from an airport.

A further object is to provide a method for checking and correcting the flight of planes.

The above and other objects will become apparent as the system is described in greater detail with reference to the annexed drawings.

In accordance with a feature of my invention, I provide a principal ground indicator used to represent the positions of the planes comprising a three dimensional display board, having a large number of lights semi-automatically operated by switching apparatus under the control of a certain number of posting operators. It is contemplated that all the information required by the posting operators will be provided in a viewing frame associated with each posting desk. This frame will be arranged to show both a cathode ray screen on which the directions, distances, identities and altitudes of all planes are automatically reported and a checking lamp board wired in parallel with the main display board to enable the posting operator to readily check whether the lamp indications which he is controlling in the main display board are in agreement with the automatic representations on the cathode ray screen.

Figure 9:
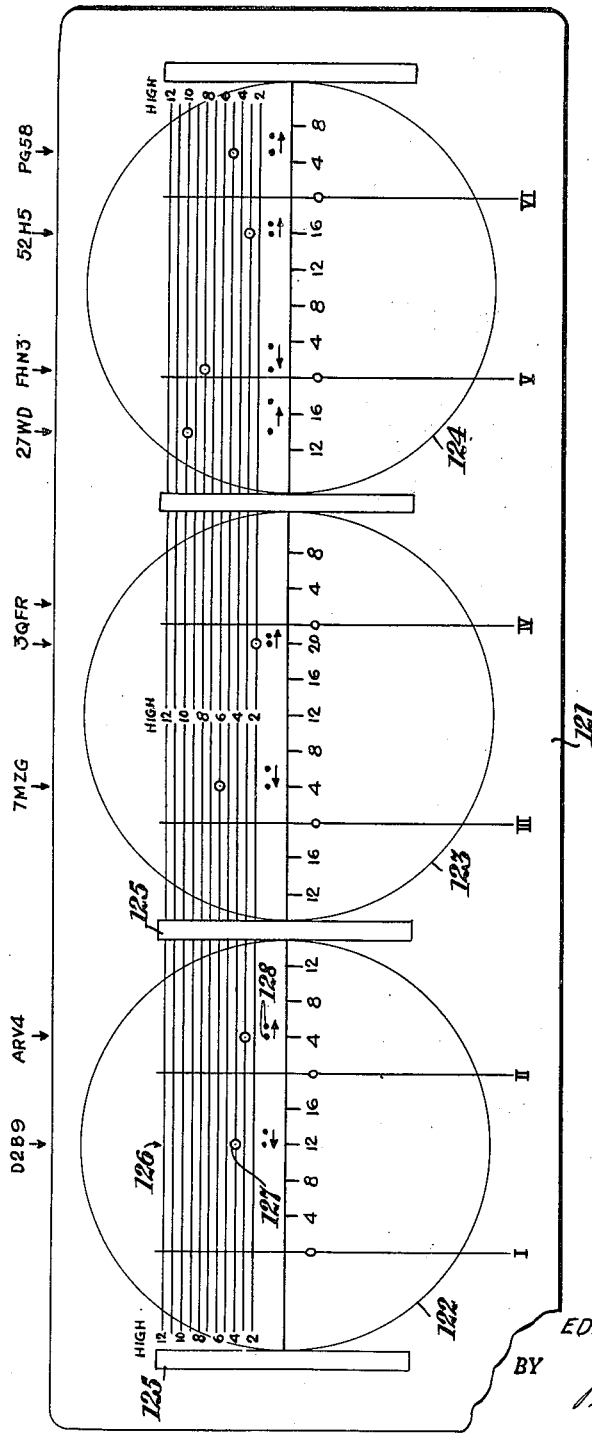
Figure 10:
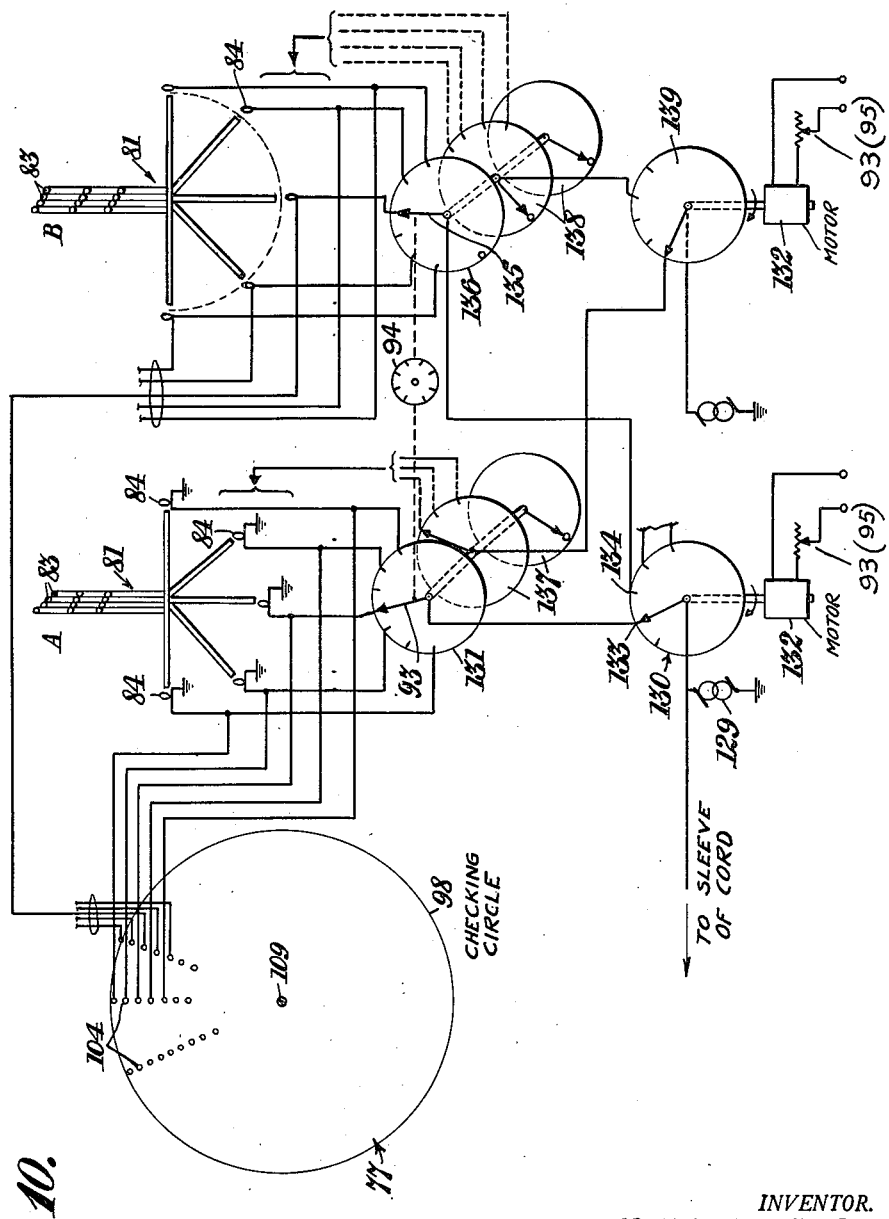

Referring now to the drawings which form a part of the description, there is shown, in Fig. 1, the schematic layout of a representative airways system;

Fig. 2, the schematic layout of an airport and its approaches;

Fig. 3, a functional diagram of airways terminal equipment;

Fig. 4, a functional diagram of rotary airport beacon;

Fig. 4A, a functional diagram of airport terminal equipment;

Fig. 5, a three-dimensional display board representing an airport;

Fig. 6, a display unit of the display board;

Fig. 7, a controls posting desk, part of the terminal equipment;

Fig. 8, a diagrammatic view of the airport as obtained in the viewing frame of the posting desk;

Fig. 9, a diagrammatic view of an airway position similar to Fig. 8;

Fig. 10, a typical circuit, schematically shown, of the display board and its controls;

Fig. 11, a block diagram of an airplane radio receiver and so much of the following translating devices as pertain to quasi-radar reception;

Fig. 12, a radar reply unit; and

Fig. 13, a block diagram of an airplane ultra high frequency transmitter for transmitting a radar reply.

In Fig. 1, there is shown in schematic form the layout of a typical airways system providing communication and quasi-radar facilities between airports 1, 2, 3, and between airports and planes 4 and 5 over intermediate repeater or relay towers 6 which may be spaced along the airway, say, every twenty miles. Each airport may be provided with a multi-channel ultra high frequency transmitter 7 adapted to send signals to other airports and to planes in flight by way of the repeater towers which are equipped with highly directional antennas providing for radiation in specified directions such as east or west, as well as upwards or for general broadcasting in all directions, thus providing facilities for communication as well as range signals.

The planes, in order to properly cooperate with the traffic-control system may be provided with transmitting and receiving equipment of their own, adapted for ultra high frequency signalling and adapted to indicate their identity and altitude as will appear at a later point.

In Fig. 2 is shown a typical airport providing facilities for the landing and take-off of a number of airplanes simultaneously on separate runways 8, of which three are shown, but which of course, may be any number conveniently handled by the airport. The port also shows two ranges 9 and 10, laid out to provide for landing or arrival ranges 11 and 12, and for departure or take-off ranges 13 and 14. The arrival and departure ranges lead to and from so-called traffic circles 15 and 16 which the respective planes are expected to follow at various altitudes going to and from the runways.

Fig. 3 is a functional representation of the air traffic-control indication equipment as employed at the airport for control of traffic along the airways.

Fig. 4 shows a form of rotary beacon, as disclosed in said Deloraine-Adams application which may be used to transmit the outgoing radar signal. It comprises a main motor connected to drive a pair of goniometers feeding the directional, or beaming, part of an antenna array 40, and also the Selsyn which governs generally the timing of the airport apparatus. The beacon includes a double pulse generator 41 for pulses such as 5µs. and 3µs. and a generator 42, of reference pulses such as 12µs., these latter being fed to the omnidirection part of the antenna, through a switch control device 43 driven also by the motor. This switch control device renders ineffective the beaming pulses when the reference pulses are effective and vice versa. A switching circuit 44 controls the connections between the transmitter 45 and the said goniometers. The double pulse generator serves to synchronize the sweep circuits in the receiver of Fig. 4A, as will be seen.

As will be explained in connection with the airport indication terminal equipment in Fig. 4A, the airway terminal would be similarly provided with a quasi-radar indication representing the positions, altitudes and identities of all planes flying along a given airway, and in addition, a three dimensional display board would preferably be provided upon which the information from the quasi-radar indicator could be semi-automatically displayed.

The general appearance of this three dimensional display board as well as the functional interrelation of the other terminal equipment is shown in Fig. 3. The construction of this board as at 17, as well as the method of controlling the illuminated spots thereof is essentially similar to that as will be described in detail for the airport display board of Fig. 4A. The only significant difference would be that the airway's display board 17 would have its rod-like display units 81 arranged in straight rows to represent one or more airways instead of having these display units arranged to represent the more complex pattern required around an airport.

Additional equipment at the air base for cooperating with an airway signalling system may also include, as shown, a quasi-radar transmitter 18 and a receiver 19. The signals emitted by the transmitter are picked up, repeated, and broadcast by the relay towers along the airway where a plane within the proper range and adequately equipped automatically sends out a reply signal which is returned to the terminal receiver by way of the towers. At this point it should be noted that for the purposes of the present invention it is not necessary to describe the details of the propagation of the quasi-radar outgoing signals by way of the towers, full description whereof is given in the referred to application of Deloraine-Adams, Serial No. 533,322. For general purposes such outgoing signal propagation is realized by the airport rotary beacon (Fig. 4). This tower repeater system may be regarded as a time multiplexed microwave artery, and plays an important role in the complex systems of the referred to applications. At a base airport the timing of the artery channels is under control of a suitable distributor or master-keyer, only briefly indicated at 24 in Fig. 3, and this in turn is tied in synchronism with other instrumentalities including the rotary beacon at said airport. These synchronizing connections are indicated at various places on the drawing where needed.

One or more of the artery channels, incoming and outgoing, are allocated for the quasi-radar service as indicated in Fig. 3. Since directive radio repeaters are well known in themselves, it is sufficient for this invention to note that the radar reply wave from the airplane is picked up by the tower which the airplane is approaching and is relayed from tower to tower till it is received by U. H. F. receiver 19 (Fig. 3). Since the airways tower system also serves as a transmission medium for a plurality of other communication channels including the transmission of voice, a switchboard 20 is provided for connecting such channels with a suitable channel combining circuit 21 which has the function to properly arrange, identify and prepare the various signals for transmission. Similarly, there is furnished between the receiver 19 and the switchboard 20 a channel separating circuit 22 in order to provide for a sifting and demodulation of the various incoming signals. The airplane location signal may be derived from a pulse generator 23 which is suitably keyed by the output of a terminal master-keyer 24 driven by a motor 25. The keyer may periodically block pulses except for those properly related in time for the position indicating purposes by means of a blocking circuit 26. The blocking circuit 26 may also serve to block the output of a sweep circuit 27 supplying a successive sweep voltage to the horizontal deflection plates 28 of oscilloscopes 29 which are arranged to indicate the location of planes along successive portions of an airway as will be described in detail in connection with Fig. 9. Thus the cathode ray tubes will not sweep the beam except at such times as circuit 26 is unblocked by keyer 24. The airplane reply signal, as separated out in the channel separating circuit 22 is applied simultaneously to the grids 30 of oscilloscopes 29. As the sweep voltage is being applied to the first oscilloscope at the instant the transmitter is emitting the original signal, the airplane reply signal at the grids 30 will serve to unblock the grid voltages so that a luminous spot indication will be obtained on the screen of the oscilloscope displaced along the horizontal axis, of which each oscilloscope forms a successive portion, an interval of time after the initiation of the sweep which is proportional to the distance of the plane from the airport. The luminous indications of the oscilloscopes and those of check lamp boards 31 which each comprises a number of horizontal and vertical rows of colored lights indicating by their location the horizontal and vertical position of the airplane along the airway under control, are superposed on a viewing screen 32 for comparative viewing in a posting desk as shown in Fig. 7. The interpretation of a detailed view of the superposed indications of the airway indication will be found in connection with the description of Fig. 9. A three dimensional representation of the airplane positions may be obtained by means of the display board 17 wherein circles 33, 34 and 35 representing airports are joined by rows of luminous units 36 each adapted to provide a luminous indication at various altitudes by means of lamps arranged under the display board and each arranged to light up a light conducting member terminating at different heights. The operation of the display and the check lamp boards is controlled by posting controls 37 and a bank of control switches 38. Further details of operation will become apparent with the description of the succeeding drawings.

Fig. 4A is a functional diagram of the indication equipment which comprises the quasi-radar receiver 61. No corresponding quasi-radar transmitter would be required in this case since a rotary beacon placed elsewhere at the airport and assumed to be provided for azimuth indications would serve as the transmitter for the quasi-radar service.

The arrangement for producing a radar reply pulse on the plane in response to the pulse transmitted from the airport, in particular, that from the rotary beacon, is shown schematically in Figs. 11, 12, and 13 and corresponds to that disclosed in said Deloraine-Adams application. Here antenna 50 receives the rotary beacon signals such as the $5\mu s$. and $3\mu s$. pulses when in the transmission alinement of the beacon, which after reception and detection are passed to width selectors 51, 52, wherein selector 51 unblocks selector 52. Thence the indicated $3\mu s$. signals are led by conductor to identify code and altitude unit 53 (Fig. 12). This unit 53 comprises merely an identity code keyer 54 continuously actuating a set of contacts at a slow rate in accordance with the Morse code representing the airplane's identification number, a simple barometer 55, (consisting of a Sylphon bellows and a simple lever linkage for swinging a condenser plate through 90 degrees under control of the movement of such bellows), and a variable delay circuit 56, including one or two tubes and arranged to trigger a pulse 10 to 100 microseconds after the reception of an applied pulse, the delay being dependent upon the capacity of the above mentioned variable condenser. It is thus seen that the reply pulses have alternate routes through said unit, depending on which position the code keyer is in. Accordingly, the identity code may be read from the receiving oscilloscope screen at the same time that an indication of altitude is produced.

The pulses thus keyed and partly delayed are led through a limiter 57 to an U. H. F. transmitter 58, which, it may be assumed, is operating at a frequency used in the said microwave artery on the tower range and finally receivable at receiver 68 (Fig. 4A).

The quasi-radar receiver 61 comprises the four U. H. F. receiving antennas 62, 63, 64 and 65 preferably located on the same mast as the transmitting antennas of the beacon hereinabove referred to. These antennas are connected to a goniometer 66 which is rotated in synchronism with the beacon by a Selsyn motor 67. The output of the goniometer 66 is connected to a receiver 68. The output of this receiver 68 is applied to the grid of one or more oscilloscopes 69.

These oscilloscopes 69 are arranged in posting desks (to be described later) for viewing by the posting operator. Although these oscilloscopes 69 are mechanically a part of the posting desk, they are represented in Fig. 4A as being part of the quasi-radar receiver 61 because of the fact that they are electrically controlled by the other elements of this unit 61, and also because of the fact that if the indicating equipment were to be provided at an airport not equipped with a quasi-radar receiver 61, the oscilloscopes 69 could be omitted from the posting desk without disturbing the other functions of the desks.

In addition to their grids, which are energized from receiver 68, as above mentioned, the oscilloscopes 69 are also controlled by magnetic deflection windings 70 which are rotated by Selsyn motors 71 in synchronism with the rotary beacon of the airport (see Fig. 4). These deflection windings 70 are energized with sawtooth current waves from a common sweep circuit 72 which is synchronized from a pulse generator forming a part of the rotary airport beacon as by the connection 73.

The transmission and utilization of signals from rotary airport beacons are disclosed in the above-mentioned application of E. M. Deloraine, H. G. Busignies and P. R. Adams. A circuit scheme for a rotary beacon is shown in Fig. 4 and it will suffice to state at this point that a sharply defined directional sweep line signal is produced and rotatably emitted. The rotary beacon circuit also has the function to supply a triggering synchronizing pulse to the sweep circuit 72 at the initiation of its signalling cycle. When thus triggered, the sweep circuit 72 commences to deliver to the deflection windings 70 of the several oscilloscopes a deflection current starting at zero and uniformly increasing in value during a given period which ensues before the next position of the transmission cycle of the beacon. Any airplanes, properly equipped with radar reply equipment, will respond to emit a reply to the airport comprising a substantially instantaneous reply signal and one that is delayed by a period representative of its altitude as explained hereinafter. These signals occur, however, only at a time when the imaginary sweep line of the rotary beacon is very nearly aligned with the airplane.

In either case, the airplane's radar reply signal after being transmitted will travel back to the center of the airport where it will be picked up by antennas 62 to 65 of the quasi-radar receiver 61. The reception diagram of this group of antennas will be favorable for receiving this signal since the goniometer 66 will be synchronized with the airport beacon in such phase that the maximum reception direction of the antennas 62 to 65 is always pointed in the same direction as the imaginary sweep line of the rotary beacon.

The airplane's radar reply signal thus picked up by the antennas 62 to 65 and transmitted in cooperation with the goniometer 66 is applied to the receiver 68.

The indication produced on the screen of any of the oscilloscopes will be in the form of a spot which becomes visible or luminous when the oscilloscope grid is excited by the plane's reply signal coming in through the receiver 68. Since the deflection sweep is triggered at the instant the beacon signal is emitted, the deflection current, at the instant, when the radar reply pulse arrives to excite the oscilloscope grid, will have a value dependent upon the time of propagation to the plane and back.

The radial displacements of the spots from the centers of the oscilloscopes will, therefore, correspond to the distance of the plane from the central part of the airport where the rotary beacon and the quasi-radar receiver 61 are located.

The angular direction in which the spots are deflected from the centers of the screens will depend upon the rotary positions of the windings 70. Since these windings are rotated in synchronism with the rotary beacon, the direction of deflection of the spots will correspond to the direction of the imaginary sweep line of the beacon. But the radar reply impulses are sent out only from these planes which are aligned with this imaginary sweep line, as previously explained, and therefore, the direction of deflection of the spots will correspond to the azimuth angle of the plane.

Thus, the spots on the screens of oscilloscope 69 will have radial displacements from the center corresponding to the radial distances of the airplanes from the airport, the directions of these displacements corresponding to the direction of the airplanes.

For the airplane's reply signal which is delayed with respect to the original reply signal in proportion to the plane's altitude, the corresponding spots shown on the screen of the oscillographs 69 will therefore be displaced outward by an extra distance corresponding to the airplane's altitude. Thus, for the delayed reply signals, the spots will be shown in a fictitious or "ghost" position, the radial direction of deflection being correct but the extent of the radial displacements being greater than the correct amount by a distance representing the airplane's altitude.

It will thus be seen that the spots representing any airplane will normally be shown on the screen in a position accurately representing the airplane's true position but will then jump outward to a ghost position somewhat farther out from the center of the screen. The separation of the true and ghost positions of the spot will represent the altitude of the airplane.

The display function which is carried out partly manually and partly automatically consists essentially of converting information received from the quasi-radar equipment, or from any other source, into a convenient three dimensional display. The equipment used to perform this function consists of the main display board 74 (to be described in detail with reference to Fig. 7) and a number of posting desks, each comprising a bank of switches 75, a board containing posting controls 76, a check lamp board 77, a viewing surface 78 for providing a schematic view of the airport superimposed on the indications obtained from the check lamp board and the respective oscilloscope one of which is also mounted on each desk.

The general appearance of a display board 79 is shown in Fig. 5. As can be seen from this figure, this board contains a number of rod-like display units 80 projecting up to a height of about 4 inches above the top of the display board. Some of these rod-like display units are arranged in a circle representing a traffic circle, while others may be arranged in straight lines representing the ranges and the straight arrival and departure branches connecting these ranges to the traffic circles. The arrangement of the rod-like member may also take the form shown in Fig. 3 at 36 to represent airways repeater stations between airports. Each such display unit will be arranged to show spots of illuminations at different elevations above the surface of the map. Thus, the positions of airplanes can be displayed in three dimensions.

There are several ways in which one can produce the desired effects of spots of illumination at different elevations. One form of display unit 81 contemplated for the purpose shown in Fig. 6 comprises a number of transparent plastic filaments 82 bunched together to form a narrow bundle somewhat more than 4 inches high with the upper ends 83 of the various filaments 82 terminated at different heights in the bundle. At the bottom of the bundle the separate filaments fan out toward a number of separate lamps 84 in separate sockets. The complete display unit would be arranged to be plugged into the display board from the underside thereof with the group of filaments projecting through a hole in the display board. Suitable terminal pins 85 would be provided for each display unit for making the required electrical connections with corresponding jacks on the under side of the display board.

Each display unit 81 will be provided with 13 filaments 82 and 13 corresponding lamps 84 for displaying illuminated spots at any of 13 heights above the display board. The highest level may be used to represent any plane flying at 13,000 feet or more and the other 12 levels may separately represent the altitudes from 1000 to 12,000 feet.

In addition to the display units, the main display board will also be provided with certain auxiliary lamps as shown in Fig. 5. There will be two such auxiliary lamps 86 and 87 adjacent each display unit of the traffic circle. One of these may be an orange lamp signifying that the plane represented on the adjacent display unit is "too close" (i. e. is flying considerably inside the circle which should be flown) while the other may be a blue lamp signifying that the plane is "too far." Also, a row of five red auxiliary lamps 88 will be provided in line with each runway to represent planes landing or taking off.

The traffic controller may be provided with a telephone plug (not shown) and a group of telephone jacks 89 may be provided along the side of the display board nearest to him to enable him to quickly give the posting operator a message for relaying to any plane (or even to enable the controller to speak directly to the plane if he wishes to do so). In order that the traffic controller may quickly identify the airplane which corresponds to any particular spot of illumination which he sees on his display board his phone plug (not shown) may be wired so that when touched against the sleeve of any one of his phone jacks, it will short circuit the corresponding lamp and extinguish the corresponding spot. Thus, by sliding his plug over the jacks until it extinguishes the spot in which he is interested and then plugging it into such jack, he will be immediately in communication with the proper posting operator who is in charge of posting the corresponding plane (and in addition, the circuits will automatically tell this posting operator which of the several planes he is handling is under consideration).

The general appearance of one of the posting desks from which the lamps of the display board would be controlled is shown in Fig. 7. Such display desk 90 includes the cathode ray tube upon the screen of which the airplanes' positions, identities and altitudes are automatically displayed by means of the quasi-radar equipment as described hereinabove, the check lamp board 77 whose lamps are wired in parallel to the lamps of the main display board but are arranged on a flat surface instead of three dimensions, and a posting shelf 91 shown as having 24 groups of posting controls 92. Each of these groups of posting controls includes a speed selection knob 93, an altitude selection knob 94 and three buttons 95 for stepping the lamp indications forward fast or slowly or backward slowly.

The posting desk also includes a viewing frame 96 in which the operator will seem to see superposed upon each other the screen of the oscilloscope 69 and the check lamp board 77. The appearance of this combined indication as seen in the viewing frame 96 is represented in Fig. 8.

In this figure the light and medium-heavy circles 97 are merely graduations to facilitate estimation of distances. The very heavy-weight circle 98 and the four heavy-weight lines 99, 100, 101, 102 extending to the points marked "EII range" and "DII range" represent respectively the circle of display units on the main display board 79, and the four straight rows of display units extending from the ranges to such circle (as in Fig. 5). Thus, all these extra heavy lines correspond to the true positions of the display units on the main display board. The groups of dots 103 are luminous spots on the cathode ray screen representing the positions and altitudes of the airplanes. The tiny circles 104 represent the corresponding lamps which have been lighted in the check lamp board, these being wired in parallel with the lamps in the display unit of the main display board. The whole task of the posting operator is to control the switches which extinguish and light these lamps so that the proper lamps will be lighted for representing the positions and altitudes of the airplanes as shown by the groups of dots 103.

Because of the fact that the spots of illumination on the main display board are given in three dimensions with 13 possible heights of illumination for each display unit, while the corresponding check lamps 104 seen by the posting operator must be arranged in two dimensions but must nevertheless include 13 check lamps 104 for each display unit 81, it is necessary to have 13 side-by-side rows of check lamps 104 for each row of display units 81. This obviously renders it impracticable to superpose all check lamps directly upon the extra heavy lines 99 to 102 representing the straight and circular rows of display units 81.

Accordingly, the check lamps 104 corresponding to the circular row of display units are arranged on 13 concentric circles 105 with the extra-heavy circle 98 serving as the 2000 foot row and with the 12 successively smaller circles 105 inside such extra-heavy circle serving as the 3000 foot to 14,000 foot rows. In the case of the check lamps corresponding to the straight rows of display units, it is believed more convenient to arrange these along the parallel grids of lines 106 shown a short distance away from the extra-heavy lines 99 to 102 which represent the corresponding rows of display units.

Consider, for instance, the heavy line 102 extending from range DII upward and to the right toward the heavy traffic circle 98, this line 102 being hereafter referred to as the DII range arrival branch. The check lamps which represent the illuminated spots 83 of the display units on the corresponding DII arrival branch 102 of the main display board are arranged in 13 parallel rows on the grid of lines 106.

It will be noted that there is a circle 104 shown on the number 6 line of this grid 106. As indicated by the marginal legend on the figure this circle 104 represents a plane whose identification number is H3J9 flying at an altitude of 6000 feet and coming in on the arrival branch 102 of the DII range. The corresponding oscilloscope representation of this plane consists of two groups of dots 107 and 108 slightly above and to the left of the corresponding check lamp 104. These two groups of dots 107 and 108 respectively represent the true position of the plane and a fictitious or "ghost" image of the plane used as hereafter explained for determining its altitude. The group of dots which is closest to the center 109 of the circle always represents the true position of the airplane. It will be seen that this group of dots 107 is about one fifth of the way down from the upper end of the line 102 representing the DII range's arrival branch. Correspondingly, the check lamp 104 is located about one fifth of the way down from the top of the line marked 6. Ideally, the position of the check lamp 104 should be exactly opposite the center of the inner group of dots 107. Actually, such exact coincidence is not always possible since there are only about 12 to 15 display units along the DII range arrival branch 102 and hence there are only about 12 to 15 check lamps on the corresponding line number 6. Nevertheless, even with this number of lamps, it is possible to maintain the circle 104 very nearly aligned with the inner group 107 of dots representing the plane position.

The outer group 108 of dots which are exactly aligned radially with the inner group represent a fictitious or ghost position of the airplane. This ghost position of the airplane is always located outside of the true position of the airplane by an amount which represents the altitude of the airplane. If the airplane's altitude is 1000 feet, the ghost position of the plane will be shown three spaces outside of the true position of this plane. For a 2000 feet altitude, the ghost would be four spaces outside of the true position. For any other altitudes, also, the number of spaces between the ghost and the true position of the plane is always two spaces greater than the altitude in thousands of feet.

It will be seen that for the airplane H3J9 which has just been considered, the ghost is eight spaces outside of the true position of the airplane and, therefore, the airplane must be at 6000 feet. Accordingly, the lamp 104 representing this plane is shown on the number 6 line of the grid 106 associated with the DII range arrival branch 102. In similar manner, the grid 110 shown below and to the left of the DII range departure branch 101 shows a check lamp 111 on the number 2 grid line representing a 2000 foot altitude. This check lamp 111 accurately represents the altitude and position of a corresponding plane X7BH, whose true position 112 is shown to be on the heavy line representing the DII departure branch 101 and whose ghost position 113 is shown to be 4 spaces outside of such true position. Also, the grid corresponding to the departure branch 99 of the EII range shows a similar check lamp 104 on the number 3 line representing a 3000 foot altitude. This represents the plane P73L whose true position is shown to be exactly on the heavy line 99 representing the EII range departure branch and whose ghost is shown to be 5 spaces further out.

In case of planes traveling around the traffice circles, these are represented on the display board by lighting corresponding spots at appropriate heights on the circle of display units 81 seen in Fig. 5. In the two-dimensional representation of Fig. 8, this circle of display units is imagined to be tipped over inwardly so that the 13 inner sets of circular graduations 105 represent the various heights of lamps on the display board. For this purpose these inner groups of graduations are numbered 2 to 14 as shown.

To facilitate the readings it is suggested, for instance, that the procedure specified for planes flying around the air port be such that the planes flying around the traffic circle at 2000 feet are supposed to fly on a circle of 9 mile radius (corresponding to the circle marked 2 in Fig. 8), while planes at 3000 feet altitudes are supposed to fly on a circle of .37 mile less than 9 miles in radius (corresponding to the first light weight circle 105 inside of the circle 98 marked 2 in Fig. 8). Similarly for each additional thousand feet of altitude the prescribed radius of flight would be decreased another .37 mile. Thus, in the ideal case, if all planes were flying at exactly the radii assigned to them, as well as at the correct altitudes, the dots 103 representing the true positions of the planes would fall on the circles which corresponded to their altitudes. Consider, for example, a plane (such as CUMN in the upper right sector of Fig. 8) accurately flying at 6000 feet and at the exact radius prescribed for that altitude. Such plane would appear in the viewing frame shown in Fig. 8 as a group of dots 103 exactly on a circle 105 marked 6. Similarly a plane (such as N39U at the left side of Fig. 8) flying at 7,000 feet and at the corresponding radius would be represented by a group of dots 103 on the circle marked 7.

Actually, however, it is recognized that the planes would not always fly accurately at their assigned circles and occasionally may not even hold accurately to their assigned altitudes. In order to check this, one could, of course, measure the distances between the true representation of each plane and its ghost representation and thus determine its true altitude and then could observe whether its true position as represented by the inner group of dots correspond to this altitude. A much simpler way of quickly checking this is available, however, because of the layout of the screen in Fig. 8. If a plane is flying at exactly its prescribed radius and altiture, its ghost will always appear on the checking circle 114 marked C which is just 4 spaces outside the circle for 2000 feet flight. Thus, if any ghost appears to be very far off this circle, the posting operator will at once know that the plane is departing considerably from its assigned altitude or radius.

Consider, for instance, the plane G3DE (shown almost directly to the right of the center of the circle). The dots 103 representing the true position of this plane lie on the circle corresponding to a 7000 foot altitude (i. e. one space from the circle marked 6). The outer group of dots 103 representing the ghost position of this airplane, however, are three spaces outside of the checking circle 114 marked C. This directly indicates that this plane is incorrect either in radius or altitude. Looking more closely, one can see that the difference between the ghost and the true position of the plane is 12 spaces. Therefore, the plane approximately must be at 12,000 feet. Assuming that this altitude has actually been assigned to plane G3DE one will know that the plane is actually flying at the correct altitude, but is flying three units outside of its assigned radius, i. e. 3×.37 miles outside of its true position. Such departure of any plane from the radius assigned to it is not at all serious, since the planes are essentially separated by altitude rather than by radial position. Nevertheless, for the convenience of the posting operator, it is desirable that the planes should so far as possible keep to their assigned radii since this will considerably reduce the difficulty of quickly checking their positions and altitudes. Accordingly, it may be desirable to call the attention of the pilot to the fact that he is not on his correct radius and to request him to pay more attention to this requirement or to check his instruments if they are at fault.

It will be noted that the check lamp 104 representing the above mentioned plane G3DE is shown on circle No. 10. This is because the plane is actually flying at 10,000 feet altitude as above determined and, therefore, should be displayed at a height of 10,000 feet on the main display board (i. e. with its check lamp shown on the 10,000 foot circle of Fig. 8).

In order to determine the identity of the planes, the groups of spots 103 as received, representing the true and ghost positions of each plane, will be flashed slowly in accordance with the Morse code representing the identity number of the plane as above explained. The flashing will be alternate so that the ghost will be illuminated when the true position is extinguished and vice-versa.

In order to control the movement of the illuminated spots 103 of Fig. 8 on the display board and of the corresponding check lamps 104, the posting operator may use the 24 groups of posting controls 92. Each of these groups of posting controls 92 is associated with one motor driven automatic telephone type switch (Fig. 10) which is capable of stepping an illuminated spot 83 (and corresponding checking spot 104) forward around the traffic circle at any one of 12 different speeds. Each group of posting controls includes one speed regulating dial 93 for selecting a speed closely approximating that of the airplane, one altitude selecting dial 94 which determines the height of the corresponding illuminated spot 83 on the display board 79 (and the row in which the corresponding check spot 104 will be displayed) and three buttons 95 for causing the spots to "inch forward" one step at a time, "inch backward" one or two steps, or "race forward" rapidly at the rate of several steps per second. Each such group of posting controls 92 also includes a set of four finger wheels 115 each having a full set of numbers and letters printed on it, these wheels being provided with recesses for the operator's fingers so that they may be quickly set up to display any four character code.

Adjacent each group of posting controls a "calling" lamp 116 and a telephone answering jack 117 may be provided. These are connected to the appropriate one of the telephone jacks 89 on the display board so that the lamp 116 will be lighted when the traffic controller inserts his phone plug in such jack 89.

Any suitable control may be provided for the purpose of turning out the illuminated spots 83 and check lamps 104 controlled by any given automatic switch and restoring the switch to its normal position. However, when altitude selecting dial 94 is set to zero altitude the associated lamps 104 are extinguished and the automatic switch may be driven around to its normal starting position ready for use in posting the next plane which may arrive in accordance with well known telephone switch practice.

Of the 24 motor driven automatic switches associated with the 24 groups of posting controls 92, we may assume that two are capable of advancing lamps along the DII range arrival branch, two are capable of advancing lamps along the DII range departure branch, while four more are similarly assigned to the arrival and departure branches of the EII range. The 16 automatic switches associated with the remaining 16 posting control groups 92 may be assumed to be capable of advancing the lamps 84 around the circle of display units 81 on the main board.

Accordingly, when a plane starts to come in from the DII range on the DII arrival branch, the proper posting operator must make use of an idle one of the two control groups 92 assigned to this branch to start an illuminated spot 83 on the display board (and a check lamp 104 on the viewing screen 78) traveling in conformity with the plane. First he will determine the altitude by noting the separation between the ghost and the true positions of the planes and will set his altitude control knob 94 to this value so as to produce a spot 104 in the correct row of lines 106 below and to the right of the DII range arrival branch 102. Next, he will estimate (or determine from the operator previously posting this plane) the approximate speed and set his speed regulating dial 93 thereto. Third he should read the Morse code of the plane to determine its identification number and set up this number on the group of 4 finger wheels 115 located immediately adjacent the group of posting controls 92 which he has chosen to represent the plane. Thereafter, he should from time to time check to see if the altitude of the plane is changing or if he has misjudged its speed, and in either such case should correspondingly correct his altitude or speed dial.

Comparatively little attention should, however, be required until the plane arrives at the traffic circle 98, at which time he will have to choose for this plane a different control group 92 out of the set of 16 which are capable of advancing lamps around the traffic circle. He will then turn the altitude control knob 94 of the previously chosen control group 92 back to zero, extinguishing the lamp, and with the "forward racing" button 95 of the newly chosen control group will advance a lamp to approximately correct position thereafter inching it to the exact position desired with the "forward inching" button 95. The altitude and speed dials 94 and 93 of the newly chosen control group 92 will be set as before to represent the speed and altitude of the plane. Thereafter as long as the plane continues to fly around the traffic circle at a constant altitude and speed, the posting operator will not need to take any further action with respect to this plane, excepting to check from time to time that its ghost remains on the checking circle 98 and its check dot 104 remains practically superposed on the spots 103 representing its true position.

The fact that the display board is not fully automatically operated but is controlled through the agency of a posting operator renders the system not only more economical but also far more flexible than a system using full automatic means for producing displays. Thus, during the transition interval when the system of the present proposal may be gradually coming into use, there may be a period of years when information with respect to the positions of some or all the planes near the airport is not yet available in accordance with the contemplated plan but is instead obtained from intermittent telephone or teletype reports. Because of the partially manual control of the display system herein disclosed, it will still be possible to post this information on the main display board in the same form in which it would be shown when the whole system ultimately became available.

The fact that the display board is semi-automatic in its operation greatly reduces the work of the posting operator as compared with other systems in which the posting operator must separately control the displaying of each successive position of each airplane. With the switching mechanisms automatically advancing the lamps at a rate selected by the posting operator, the latter's duties consist essentially of setting up the posting controls initially when a plane enters a new section (e. g., enters an arrival branch from a range or enters a circle from an arrival branch) restoring the posting controls to inoperative condition when a plane leaves a given section, and periodically checking the correlation between the check lamps and the indicated plane positions to make necessary corrections in speed or altitude if these vary.

The general appearance of the airway posting desks used for controlling the movement of the illuminated spots on the airway display board of Fig. 4A would be essentially the same as the appearance of the airport posting desk 90 (shown in Fig. 7) excepting that three cathode ray tubes of slightly smaller diameter would be substituted for the one very large cathode ray tube 69 illustrated. The posting controls and the general relationships of the viewing frame, the cathode ray screen and the check lamp board would, however, be substantially as shown in Fig. 7.

The viewing frame of the airway posting desk would appear as at 121 illustrated in Fig. 9. The three circles 122, 123, 124 represent the screens of three oscilloscopes while the heavily lined rectangles 125 at the left and right margins of these circles represent masking strips used for covering the undesired marginal portions of these screens. The vertical lines I, II . . . VI represent the positions of successive towers along the airways, these vertical lines as well as the mileage scales being engraved on a ground glass which forms the front surface of the check lamp board (c. f. 77 in Fig. 7). The grid 126 of twelve horizontal lines marked "2, 4 . . . high," represents the different altitude levels; and the check lamps shown as small circles 127 are arranged in twelve rows along these lines. The tiny dots 128 shown just above the scale of miles are the luminous spots which represent the planes on the cathode ray screen. (The arrows shown below these spots do not exist at all, but are merely shown in the picture to indicate the direction in which the luminous spots are moving.)

It will be noted that each plane is represented by two luminous spots as well as by a check lamp. The right hand one of these two luminous spots represents the altitude of the airplane according to any suitable scale which would be measured by means of dividers or other suitable means. Alternatively, a large number of fine vertical graduations could be provided just above the scale of miles so that the operator could by counting these graduations determine the altitude of any plane without the use of dividers.

In addition to representing the positions and altitudes of the airplanes as above explained, the spots may also indicate the identities of the airplanes by a Morse coding. The two dots representing any plane are not actually illuminated at the same time, but are alternately flashed in a complementary rhythm representing the dots or dashes of the airplane's identifying code. Thus, the dots representing each airplane appear as a dot which normally lies in the true position of the airplane but which jumps slightly to the right during each dot or dash of the identification number. The luminous persistence of the cathode ray screen is preferably sufficiently short so that such identification code can easily be read, while still being sufficiently long so that there will be no difficulty in measuring the distance between the two positions of any dot by the use of dividers or graduations as previously explained.

The diagram of Fig. 10, represents in functional and fragmentary form a possible circuit and automatic switching arrangement for the control of the display board lighting as well as that of the check lamp board 77. The altitude indicating lamps 84 of the displayments 81 are shown to be connected in parallel with the check lamps 104 of the check lamp board 77, the parallel circuit being supplied from the source 129 through a motor driven position selecting stepping switch 130 and the manual control 94 of an altitude selecting stepping switch 131. As referred to hereinbefore, the posting desks are each provided with the controls 95 for regulating the speed of a motor 132 driving the position selecting switch 130 at a speed corresponding to a given airplane speed so that the respective display units and check lamps are lighted in step with the oscilloscope indications. In the diagram, voltage is supplied from the source 129 through a contact 133 of the step switch 130 to the display unit A through the altitude control 94. After a suitable interval of time, depending on the speed of the motor 132, the display unit B will be supplied over contact 134. Although not fully shown, an altitude selector control 135 of an altitude selector switch 136 may be made to move automatically into an altitude selecting position analogous to that of switch 131 upon the change from step 133 to 134 in order to illuminate the proper lamp in the display unit B and on the check board 77. The form of altitude control indicated is a direct manual control, which of course can operate to control altitude indication by any lamp of the series of lamps under a given control unit of a posting desk. In order to accommodate the indication for additional planes, switches 131 and 136 are seen by way of illustration, to have associated with themselves additional contact plates 137 and 138, respectively, which may be connected to the source 129 through a position selector switch 139 and others as needed, and whose contacts in turn are connected to said display and checking lamps.

For the sake of economy and reliability, it is preferred to use existing types of telephone selector switches which have been successfully manufactured and employed for many years in the field of automatic telephony. In order to adapt these to the ideal requirements above set forth, it would be possible to gang several such switches together for each switch required. It is virtually certain, however, that a considerably more efficient and economical arrangement can be devised using a small amount of equipment with more complex circuits.

In addition to the possibility of greatly reducing the amount of the equipment required by means of the various equipment-saving circuit principles which have been worked out and used for many years in the field of automatic telephony, it is also probable that other circuit features taken from the telephone art can be used to actually improve the performance, as by making manual operations more nearly automatic. It is believed, therefore, that further details of the automatic switching arrangements can best be disregarded, since it is certain that the required functions can readily be performed and since it is almost equally certain that the particular circuits which will finally be used will involve many short cuts and improvements too complex to merit discussion at this point.

While I have described above the principles of my invention in connection with specific apparatus, and particular modifications thereof, it is to be clearly understood that this description is made only by way of example and not as a limitation on the scope of my invention as set forth in the objects of my invention and the accompanying claims.

I claim:

1. In a system for remotely indicating the position of a given airplane, the combination of means controlled by the airplane for luminously indicating the position of the airplane with respect to a reference, means locally controlled in part manually for luminously indicating the said position of said airplane in semblance of the indication controlled by the airplane, and means for optically superposing said first and said second indication for comparative viewing.

2. In a system for remotely indicating the position of a given airplane in flight, the combination of means controlled by the airplane for luminously indicating the position of the airplane with respect to a reference, means locally controlled in part manually for producing a luminous indication of the said position of said airplane in semblance of the indication controlled by the airplane, means for maintaining said second named indication substantially in step with said first indication, and means for optically superposing said first and said second indication for comparative viewing.

3. In a system for remotely indicating the position of a given airplane, the combination of oscillograph means controlled by the airplane for producing a luminous indication of the position of the airplane with respect to a reference, means locally controlled in part manually for luminously indicating the said position of said airplane in semblance of the indication controlled by the airplane, and means for optically superposing said first and said second indication for comparative viewing.

4. In a system for remotely indicating the position of a given airplane, the combination of an oscillograph including rotary deflection field means controlled by the airplane for luminously indicating at least the relative angular position of the airplane with respect to a reference, means locally controlled in part manually for luminously indicating at least the said relative angular said position of said airplane in semblance of the indication controlled by the airplane, and means for optically superposing said first and said second indication for comparative viewing.

5. In a system for remotely indicating the position of a given airplane in flight along a substantially straight line course, the combination of means controlled by the airplane for indicating the linear displacement position of the airplane with respect to a point of reference, means locally controlled in part manually for progressively indicating the said position of said airplane at least along a linear course in semblance of the indication controlled by the airplane, and means for optically superposing said first and said second indication for comparative viewing.

6. In a system for remotely indicating the position of a given airplane in flight along a given course, the combination of oscillograph means controlled by the airplane for luminously indicating the varying position of the airplane with respect to a reference, means locally controlled in part manually for progressively indicating the said varying position of said airplane in like manner to that controlled by the airplane, and means for optically superposing said first and said second indication for comparative viewing.

7. In a system for remotely indicating the position of a given airplane in flight along a given course, the combination of means controlled by the airplane for luminously indicating the position of the airplane with respect to a reference, means locally controlled in part manually for producing a luminous indication of the said position of said airplane, means for progressively moving said last named indication at a speed substantially proportionate to that of the airplane, means for optically superposing said first and said second indication for comparative viewing, and means for altering the position of said last named indication in accordance with said first named indication to correct for differences between the proportionate and actual speed of the airplane as indicated.

8. In a system for remotely producing a three-dimensional indication of the position of a given airplane in flight, the combination of means controlled by the airplane for indicating three dimensions determinative of the position in space of the airplane with respect to a reference, means locally controlled in part manually and in accordance with said dimensions as indicated for substantially reproducing said indication, and means remote with respect to said first and said second named means for substantially reproducing in a three dimensional display said indication in operative connection with said second named means.

9. In a system for remotely producing a three-dimensional indication of the position of a given airplane, the combination of means controlled by the airplane for luminously indicating three dimensions determinative of the position in space of the airplane with respect to a reference, means locally controlled in part manually for substantially reproducing said luminous indication, means for optically superposing said first and said second indication for comparative viewing, and means remote with respect to said first and said second named means for substantially reproducing in a three dimensional display said indication in operative connection with said second named means.

10. In a system for remotely producing a three-dimensional indication of the position of a given airplane, the combination of oscillograph means controlled by the airplane for luminously indicating the position of the airplane with respect to a reference, means locally controlled in part manually and in accordance with said position as indicated including a plurality of lamps for substantially reproducing said luminous indication by any of said lamps, and means remote with respect to said first and said second named means for substantially reproducing in a three dimensional display said indication in operative connection with said second named means.

11. In a system for remotely producing a three-dimensional indication of the position of a given airplane in flight along a given course, the combination of oscillograph means controlled by the airplane for luminously indicating the position of the airplane with respect to a reference, means locally controlled in part manually and in accordance with the position as indicated including lamps forming a plurality of units for substantially reproducing said luminous indication by any of said lamps, and means remote with respect to said first and said second named means for substantially luminously reproducing in a three dimensional display said indication in operative connection with said second named means.

12. A system in accordance with claim 11, wherein said last named means includes a plurality of lamp units electrically connected to said first named units, each unit including a plurality of light conducting members.

13. A system in accordance with claim 12, wherein there is provided means for progressively moving said locally controlled indication from unit to unit at a speed substantially proportionate to that of the airplane.

14. In a system for remotely producing a three-dimensional indication of the position of a given airplane in flight along a given course, the combination of means controlled by the airplane for luminously indicating the position of the airplane in altitude and linear displacement with respect to a reference, means locally controlled in part manually and in accordance with said position as indicated including a plurality of lamps each representing a point in altitude grouped into a plurality of units each representing a point in linear displacement for substantially reproducing said luminous indication both in altitude and linear displacement, and means remote with respect to said first and said second named means for substantially reproducing in three dimensions said indication in operative connection with said second named means.

15. A system in accordance with claim 14, wherein said last named means is comprised of altitude indicating units corresponding to and operatively controlled with said first named units.

16. In a system for remotely producing a three-dimensional indication of the position of a given airplane in flight along a given course, the combination of means controlled by the airplane for progressively indicating the position of the airplane with respect to a reference, means locally controlled in part manually for substantially reproducing progressively said indication at substantially a speed proportionate to that of the plane and having a speed adjustment, and means remote with respect to said first and said second named means for substantially reproducing in a three dimensional display said indication in operative connection with said second named means.

17. In a system for remotely producing a three-dimensional indication of the position of a given airplane in flight along a given course, the combination of means controlled by the airplane for luminously indicating the progressive position of the airplane with respect to a reference, means locally controlled in part manually for substantially reproducing said luminous indication, means for progressively moving said second indication at a speed substantially proportionate to that of the plane, optical means for superposing said first and said second named indications for comparative viewing, means for adjusting the speed of said means for moving to correct for differences in speed of said first and said second indications as obtained from said optical means, and means remote with respect to said first and said second named means for substantially reproducing in a three dimensional display said indication operatively controlled by said second named means.

18. An indicating in three dimensions system for indicating on a replica of a course the position and movement of a movable object along said course, comprising means for moving an indication along said replica of said course at a speed proportionately an approximation of the speed of movement of said object, means for indicating in distance from the plane of said replica the altitude of the position of said object forming a part of said first named means, means for progressively ascertaining the actual position and altitude of said movable object, and means for altering the position of said indication with respect to its altitude and along said replica in accordance with said ascertained position to correct for differences between the proportionate approximate speed of movement indicated and the actual ascertained speed and for differences in ascertained and indicated altitude.

19. An indicating in three dimensions system for indicating on a replica of a course the position and movement of a movable object along said course, comprising means for moving an indication along said replica of said course at a speed proportionately an approximation of the speed of movement of said object, means for inindicating in distance from the plane of said replica the altitude of the position of said object forming a part of said first named means, means for progressively ascertaining the actual position of said movable object, means for comparing indications due to said means for moving and said means for ascertaining, and means for altering the position of said indication with respect to its altitude and along said replica in accordance with said ascertained position to correct for differences as obtained from the means for comparing between the proportionate approximate speed of movement indicated and the actual ascertained speed and for differences in ascertained and indicated altitude.

20. A method of indication in three dimensions on a replica of a course the position of movement of a movable object along said course, comprising moving an indication along said replica of said course at a speed proportionately an approximation of the speed of movement of said object and at a corresponding altitude above the plane of said replica, ascertaining the actual position and altitude of said movable object, and altering the position of said indication along said replica in accordance with said ascertained position to correct for differences between the actual and indicated altitude and between the proportionate approximate speed of movement indicated and the actual ascertained speed of movement.

21. A method for reproducing in three dimensions the position of an airplane in flight along a given course comprising obtaining by means of a signal from the plane a progressive visible indication of its position in altitude and displacement with respect to a two dimensional replica of said course, locally reproducing in visible form with respect to said replica the indication obtained from the plane for comparative viewing in two dimensions with said progressive visible indication, and utilizing said locally produced indication for reproducing a progressive indication in three dimensions.

22. An indicator board for indicating the progress of an aircraft along a given course comprising a plurality of light conducting indicator rods of different lengths arranged on said board in a pattern simulating said given course, means for selecting said rods in accordance with the altitude of said craft, and means for progressively illuminating said selected rods in accordance with the progress of said craft along said course.

23. An indicator board for indicating the progress of aircraft along a given course comprising a plurality of indicator units arranged on said board in a pattern simulating said given course and comprised of light conducting rods of different lengths, means for selecting said units in accordance with the position of said craft along said course, means for selecting said rods in accordance with the altitude of said craft, and means for progressively illuminating said selected units in accordance with the progress of said craft along said course and in accordance with a given altitude.

24. An indicator board according to claim 22 wherein said last named means comprises a lamp positioned to illuminate each of said rods, switch means for successively lighting said lamps, and means for controlling operation of said switching means in accordance with the position and altitudes of said craft.

25. An indicator according to claim 23 wherein said last named means comprises a lamp positioned to illuminate each of said rods, switch means for successively selecting said units, a plurality of switch means for successively lighting said lamps for indicating altitudes of a plurality of aircraft, and means for controlling operation of said first and said second named switching means in accordance with the position and altitudes of said craft.

26. A system for producing an indication of the position including altitude of a given airplane in flight comprising means controlled by the airplane for indicating the said position with respect to a reference, and means locally controlled in part manually for substantially reproducing in three dimensions said indication with altitude shown in distance from the plane of said reference.

EDMOND M. DELORAINE.

REFERENCES CITED

The following references are of record in the file of this patent:

UNITED STATES PATENTS

| Number | Name | Date |
| --- | --- | --- |
| 830,718 | Holt | Sept. 11, 1906 |
| 1,888,486 | Boedtcher | Nov. 22, 1932 |
| 1,999,810 | Hershey | Apr. 30, 1935 |
| 2,035,998 | Thompson | Mar. 31, 1936 |
| 2,252,083 | Luck | Aug. 12, 1941 |
| 2,286,014 | Rowe | June 9, 1942 |
| 2,344,760 | Wight | Mar. 21, 1944 |
| 2,344,761 | Wight | Mar. 21, 1944 |
| 2,371,749 | Field | Mar. 20, 1945 |

FOREIGN PATENTS

| Number | Country | Date |
| --- | --- | --- |
| 473,024 | Great Britain | Oct. 4, 1937 |